(12) United States Patent　　(10) Patent No.: US 10,154,663 B2
Brugh et al.　　(45) Date of Patent: Dec. 18, 2018

(54) INDOOR LIVE BIRD CAPTURE SYSTEM

(71) Applicant: Meridian Wildlife Services, LLC, Christiansburg, VA (US)

(72) Inventors: David Henry Brugh, Christiansburg, VA (US); Brian Chandler Burke, Troutville, VA (US)

(73) Assignee: Meridian Wildlife Services, LLC, Christiansburg, VA (US)

( * ) Notice: Subject to any disclaimer, the term of this patent is extended or adjusted under 35 U.S.C. 154(b) by 0 days.

(21) Appl. No.: 15/851,925

(22) Filed: Dec. 22, 2017

(65) Prior Publication Data

US 2018/0116201 A1　　May 3, 2018

Related U.S. Application Data

(62) Division of application No. 15/048,231, filed on Feb. 19, 2016.

(51) Int. Cl.
*A01M 23/00* (2006.01)
*A01K 37/00* (2006.01)
*B25G 1/04* (2006.01)

(52) U.S. Cl.
CPC .............. *A01M 23/00* (2013.01); *A01K 37/00* (2013.01); *B25G 1/04* (2013.01)

(58) Field of Classification Search
CPC ....... A01M 23/00; A01K 31/07; A01K 37/00; A63B 71/022
USPC ................ 43/58, 60; 119/339, 340; 473/197
See application file for complete search history.

(56) References Cited

U.S. PATENT DOCUMENTS

| | | | |
|---|---|---|---|
| 4,791,753 A | 12/1988 | Fuhrman | |
| 5,655,766 A * | 8/1997 | Klebe, Jr. | A63B 71/022 473/197 |
| 5,966,862 A | 10/1999 | Ueno | |
| 6,776,733 B2 * | 8/2004 | Schroeder | A63B 61/02 473/473 |
| 7,344,458 B2 * | 3/2008 | Connerley | A63B 61/003 473/490 |
| 8,573,565 B1 * | 11/2013 | Lyndaker | A63B 71/0054 256/23 |
| 8,733,291 B2 | 5/2014 | Dunigan | |
| 8,800,157 B2 * | 8/2014 | Lorhpipat | A63B 61/04 33/613 |
| 2010/0120558 A1 * | 5/2010 | Conforti | A63B 71/022 473/435 |
| 2013/0081323 A1 | 4/2013 | Alfarhan | |

(Continued)

FOREIGN PATENT DOCUMENTS

| | | |
|---|---|---|
| CN | 202857644 U | 4/2013 |
| CN | 103598174 A | 2/2014 |

(Continued)

OTHER PUBLICATIONS

"How can I catch a wild bird inside a store?", Yahoo Answers, http://answer.yahoo.com/question/index?qid=20090404110049AA1QcVW, Jul. 2, 2015.

*Primary Examiner* — Kathleen I Alker
*Assistant Examiner* — Danielle A Clerkley
(74) *Attorney, Agent, or Firm* — James G. Passé; Passé Intellectual Property, LLC

(57) ABSTRACT

A bird capture net which allows the use of quickly adjusting the height for capture and release is described, which includes height adjustable poles attached to bird netting.

3 Claims, 4 Drawing Sheets

(56) References Cited

U.S. PATENT DOCUMENTS

| | | | | |
|---|---|---|---|---|
| 2013/0190109 A1* | 7/2013 | Rigoli | .................. | A63B 63/004 |
| | | | | 473/478 |
| 2014/0141906 A1* | 5/2014 | Hulbert | ................ | A63B 71/022 |
| | | | | 473/415 |
| 2015/0059234 A1* | 3/2015 | Dykes | .................. | A01M 23/20 |
| | | | | 43/61 |
| 2015/0296766 A1* | 10/2015 | Gaskamp | .............. | A01M 23/22 |
| | | | | 43/61 |

FOREIGN PATENT DOCUMENTS

| | | | |
|---|---|---|---|
| CN | 203416746 U | 2/2014 |
| CN | 203424205 U | 2/2014 |
| JP | 5023090 A | 2/1993 |
| JP | 5123074 A | 5/1993 |
| JP | 6133665 A | 5/1994 |
| JP | 9074976 A | 3/1997 |

* cited by examiner

INDOOR LIVE BIRD CAPTURE SYSTEM

This application is a divisional of U.S. non-provisional application Ser. No. 15/048,231 filed on Feb. 19, 2016 and which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to the live capture of flying vertebrates in an indoor setting. In particular, it relates to a net deploying system designed for inside large enclosure buildings.

Description of Related Art

The advent of large warehouses, big box stores, large grocery stores, malls, and the like, has caused an increase in the number of birds, as well as other large flying vertebrates, such as bats, finding their way inside the buildings. Depending on the species, if there is no action to get rid of the flying vertebrate, it can remain in the building for an extended time. This can cause the spread of disease, problems because of defecation, annoyance to customers, as well as the destruction of products inside the store.

A number of methods are utilized to capture flying vertebrates. Traps are used, but frequently the traps are not very humane. Birds are somewhat attracted to light, so that dimming the store lights and hoping the vertebrate will head for the outside light is also utilized. Netting can be setup inside the building, but the time it takes to set up the net is lengthy, and if the net misses the vertebrate, it needs to be taken down and set up again. All these methods can lead to harming the vertebrate, while they are also not entirely effective. Though these methods have been around for decades, there is a need for a better method of removing flying vertebrates from a large building.

BRIEF SUMMARY OF THE INVENTION

The present invention relates to a more humane flying vertebrate capture system, with the use of telescoping or height adjustable support poles, for deploying a bird netting with or without pockets. The bird netting can be deployed, repositioned, and lowered for capture much quicker and easier than nets directly attached to the roof or rafters, thus allowing for a much higher chance of recovering the flying vertebrate without harm.

Accordingly, in one embodiment, there is a method for the safe live capture of a flying vertebrate inside a large building comprising:
a) determining the species of flying vertebrate inside the building;
b) selecting bird netting;
c) attaching a plurality of adjustable height support poles to the netting, the poles comprising:
 i. a hook for attaching the poles overhead;
 ii. a pulley attached to an upper portion of the pole; and
 iii. a rope attached to the pulley, the rope having devices to attach the bird netting to the rope;
d) positioning the netting for capture based on the species of flying vertebrate and their flight characteristics utilizing the height adjustable poles to raise the netting;
e) driving the flying vertebrate or waiting for the vertebrate to fly into the netting pockets;
f) lowering the netting using the height adjustable support poles; and
g) removing the flying vertebrate from the netting.

In another embodiment, there is a device for repeated quick set up for safe live capture of a flying vertebrate in a large building comprising:
a) bird netting; and
b) a plurality of adjustable height support poles attached to the netting, the poles comprising:
 i. a hook for attaching the poles overhead;
 ii. a pulley attached to an upper portion of the pole; and
 iii. a rope attached to the pulley, the rope having devices to attach the bird netting to the rope.

DETAILED DESCRIPTION OF THE INVENTION

Figure 1:
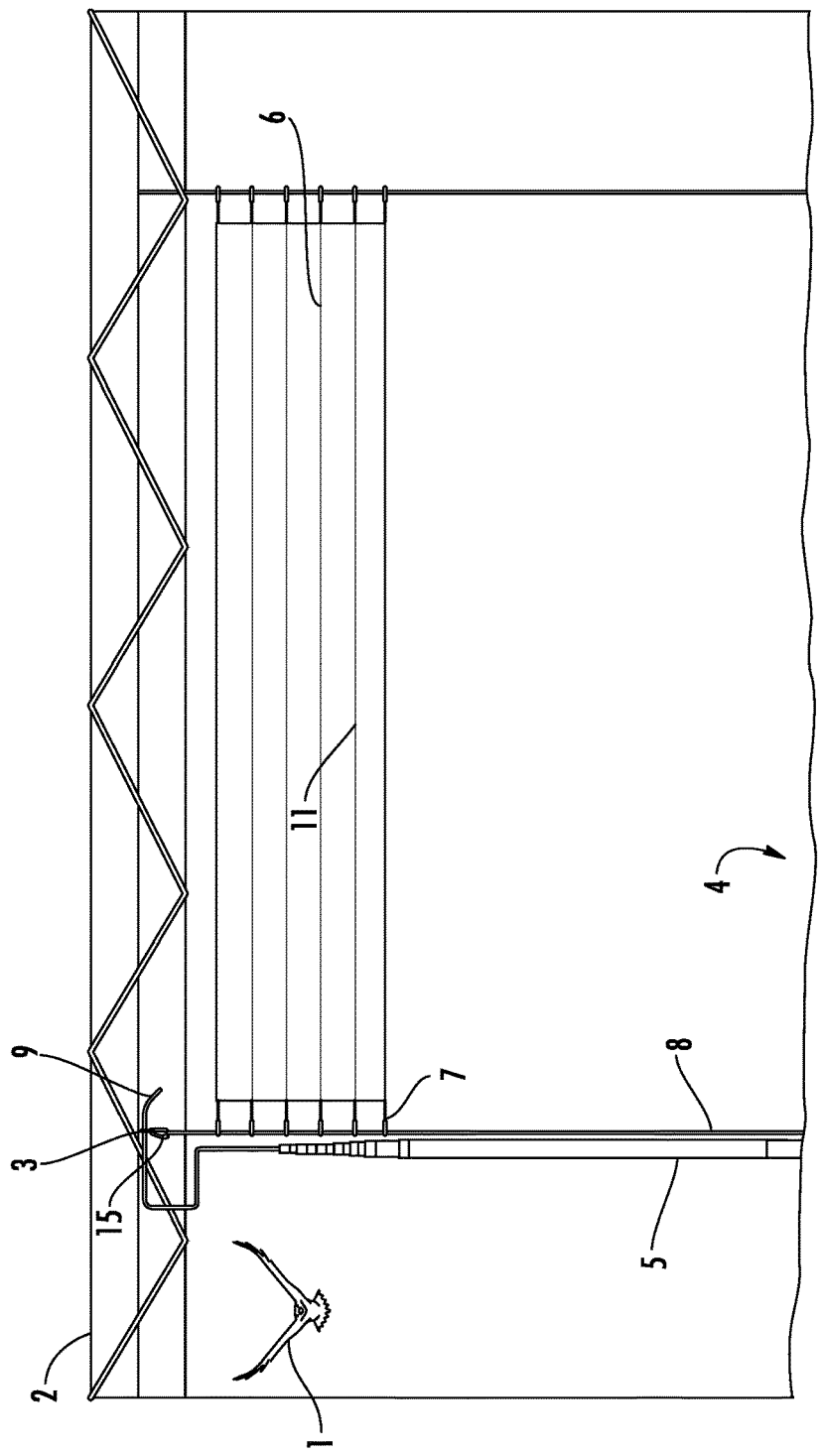
FIG. 1 is a perspective view of the system of the present invention in position in preparation for capture.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

Use of the word term herein also refers to a phrase in defining a term.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "flying vertebrate" refers to birds, bats or any large flying mammal or the like.

As used herein, the term "rope" refers to cord, rope, string, or the like used to raise or lower the netting attached to it.

As used herein, the term "adjustable height support poles" refers to poles that can change in height by any means. In one embodiment, it is a telescoping pole that can lock in an up and down position. The pole has a hook at the top for attaching the pole to the rafters, beams, or the like on the ceiling. In one embodiment, the poles extend to 24 feet or more telescopically.

As used herein, the term "positioning the netting for capture" refers to placing the bird net in an upper position wherein the flying vertebrate can fly into the netting.

As used herein, the term "large building" refers to interiors of buildings such as large box stores, warehouses, storage facilities, retail buildings and the like. These types of buildings typically have high ceilings, making flying vertebrate removal very difficult.

As used herein, the term "pulley" refers to a device that the rope can pass through in order to raise or lower bird netting to the ends of the poles, such as the top. In one embodiment, it is a carabiner, as shown in the drawings. A plurality of devices to attach the net to the rope are placed on the rope. In one embodiment, the attachment device is a clip, as shown in the drawings.

As used herein, the term "bird netting" refers to nylon or other plastic netting designed in the trade for the capture of birds. These typically have one or more pockets designed to trap a bird, but that is just an embodiment. These types of nets run large and can have dimensions over 30 feet in length.

As used herein, the term "determining the species" refers to observing the flying vertebrate and having an expert, a guide book, or the like, for determining what kind of flying vertebrate needs to be captured. One can also observe the surrounding area for determination of the likely species to be captured in a large building, to aid in prevention of further entry by a flying vertebrate.

As used herein, the term "flight characteristics" refers to the flying vertebrate, once it has been identified, one can determine how it flies. e.g. a bat flies in a different pattern than a sparrow. That flight pattern can then be used to place the netting in relationship to the position of the flying vertebrate.

As used herein, the term "driving the flying vertebrate" refers to getting the flying vertebrate to fly, by making a loud noise, approaching the vertebrate, or by the placement of food, light, or odorant or the like. If the netting is placed correctly, then driving the vertebrate will cause it to fly into the netting and one of the pouches in the netting.

As used herein, the term "removal of the flying vertebrate from the netting" refers to a key part of the present invention wherein the flying vertebrate is manually removed from the net once captured.

As used herein, the term "adapting the building" refers to taking the information about what species of flying vertebrate has entered the building and then adapting the building so that that species cannot easily return to the inside of the building. So, for example, eliminating nesting spots or using repellant at spots normally used for nesting, both outside and inside the building. Also adapting the entrances to prevent the species of bird from entering the building. Other structural vulnerabilities are generally looked for, including looking for holes and gaps, locations for entry, nesting and the like.

DRAWINGS

Now referring to the drawings, FIG. 1 is a perspective of the device of the present invention. In this view, flying vertebrate bird 1 is shown flying around the ceiling 2 of a large warehouse building having rafters 3. Sitting on the floor 4 of the building are adjustable poles 5 in their extended position. The system capture net 6 consists of net 6 mounted on height adjustable posts 5 by attaching it to clips 7 on rope 8. The adjustable posts 5 in this embodiment are telescoping poles, however other height adjustable shafts are anticipated. Hook 9 is attached to rafter 3. The rope 8 on each pole 5 runs through pulley 15 and is lengthened to allow the net to be pulled together to the desired tension. Pockets 11 are formed based on the tension.

Figure 2:
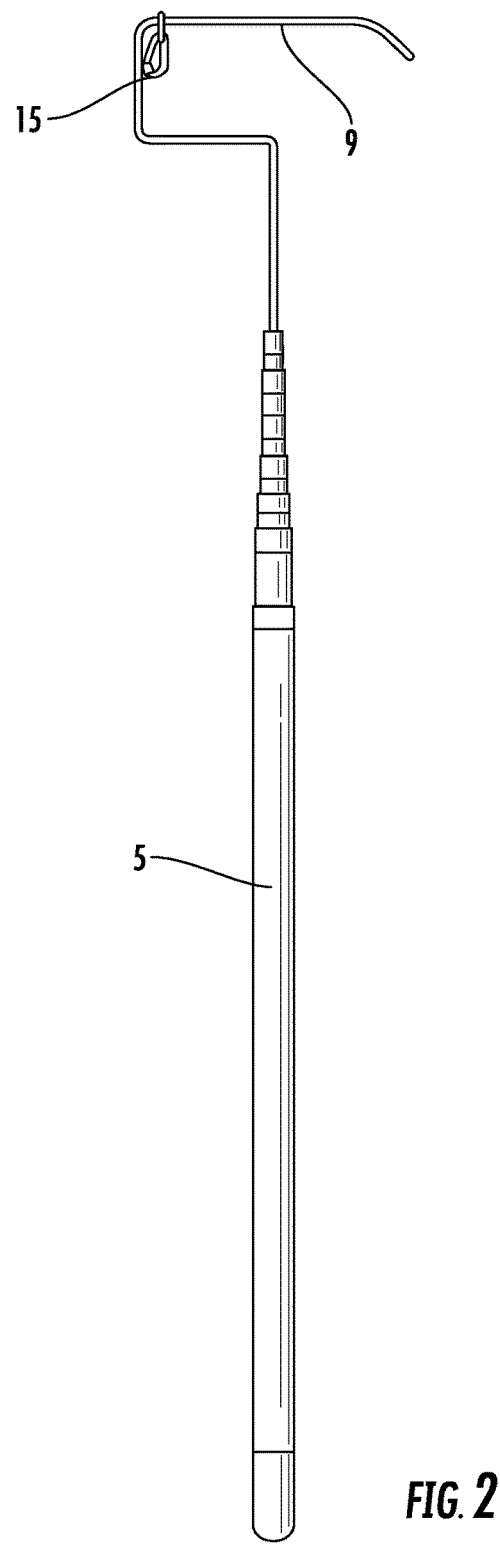
FIG. 2 is a perspective view of the system of the present invention's height adjustable pole.

In FIG. 2 the system capture pole 5 is collapsed with pulley 15 shown positioned in an upper position. The height adjustable poles 5 are shown having telescoped into their lowest position.

Figure 3:
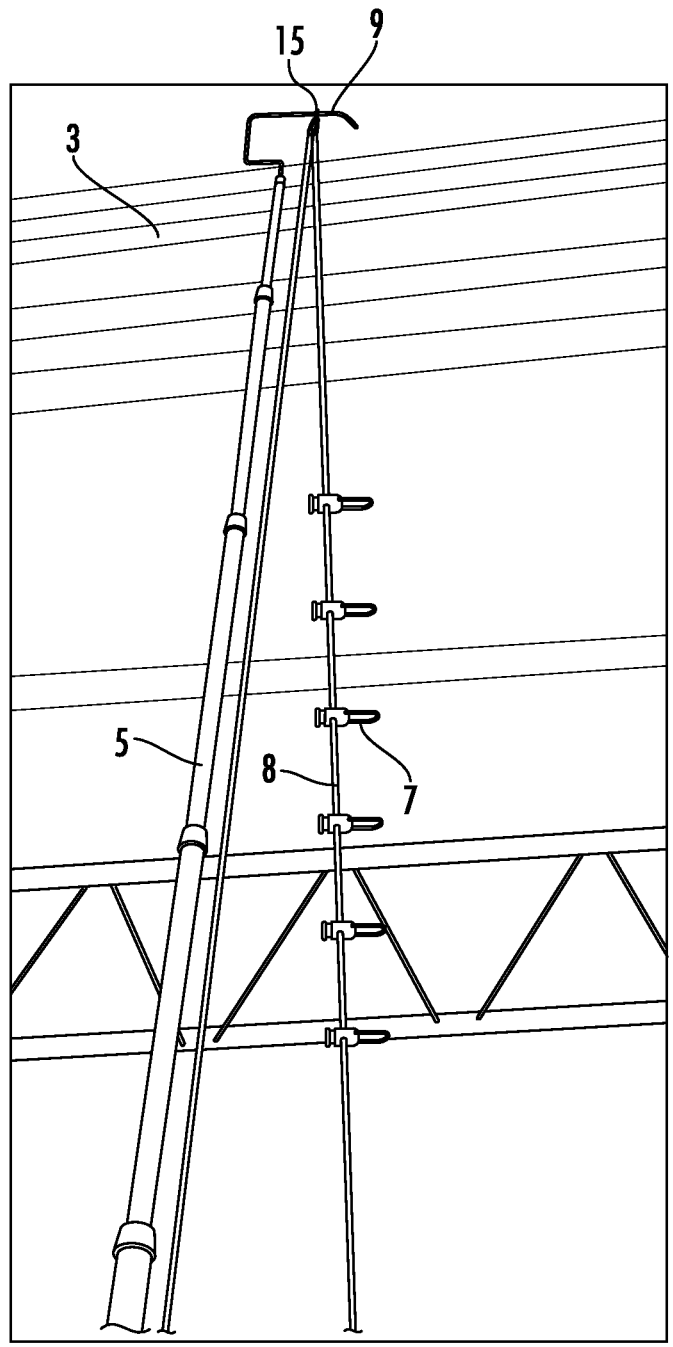
FIG. 3 is a view of the rope with clips attached to the pole with the pulley.

FIG. 3 shows a single pole 5 extended with rope 8 and clips 7 clearly shown.

Figure 4:
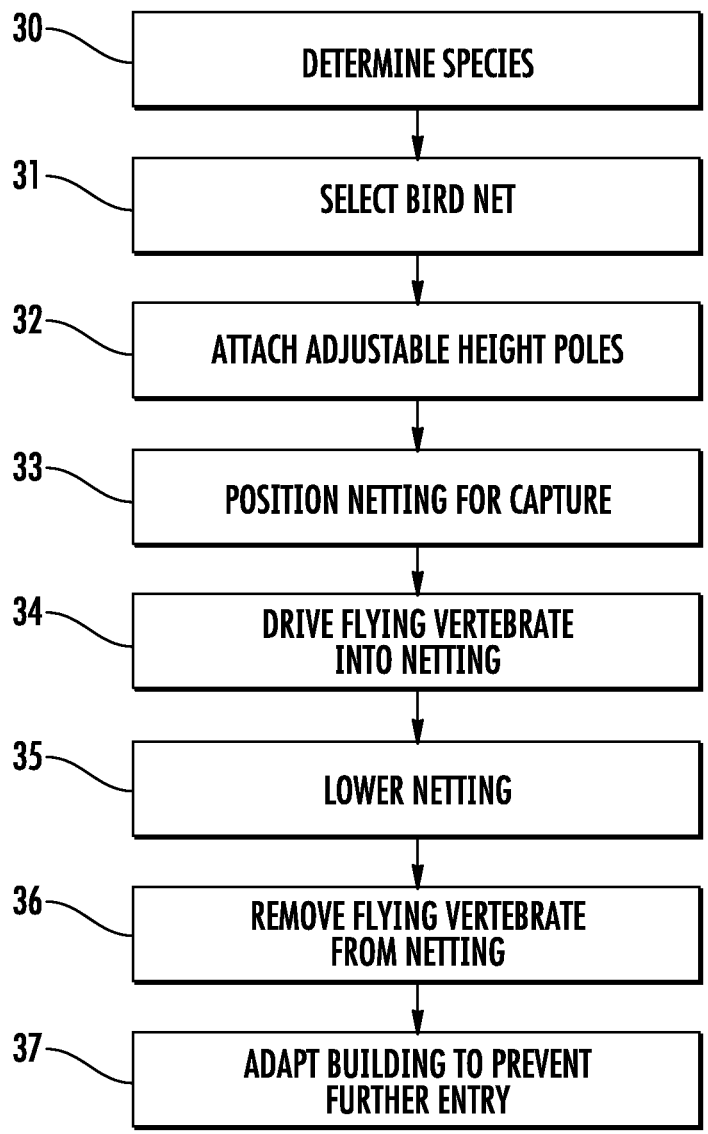
FIG. 4 is a flow chart of the method of the present invention.

In FIG. 4 there is a flowchart of the method of the present invention. The user of the system first determines the species 30 of the flying vertebrate by inspecting the vertebrate in the location, inspecting evidence in the surrounding area of the types of vertebrates in the area, as well as the location of the vertebrate in the building. Next, a bird netting with pockets is selected 31 and height adjustable poles attached to the bird netting for raising and lowering the net during use 32. The netting is then positioned in an upper position for capture 33 so the bird can fly or be chased into the netting 34 or, better still, into one of the pockets and get stuck there. Once the bird is captured, the netting can be lowered 35 in order to remove the bird from the netting 36 and release it in the wild. Once the bird is retrieved, an optional additional act of adapting the building to prevent the species from further entry 37 can be done making sure that doors stay closed, repellants utilized, elimination of attractants and the like are utilized.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A device for repeated quick set up for safe live capture of a flying vertebrate indoors in a large building having a floor and a ceiling supported by rafters or beams comprising:
   a) bird netting capable of catching and holding the flying vertebrate when it flies into the bird netting; and
   b) a plurality of adjustable height vertical support poles attached to the netting, the poles for sitting on the floor and comprising:
      i. a hook positioned at a top of each pole of the plurality of poles configured to attach the plurality of poles overhead to the ceiling by attachment over the top of one of the ceiling rafters and the ceiling beams;
      ii. a pulley attached to an upper portion of at least one pole of the plurality of poles; and
      iii. a rope attached to the pulley, the rope having attachment devices to attach the bird netting to the rope, wherein the rope is configured to raise the entire bird netting to the upper portion of the plurality of poles in a deployed position to capture the flying vertebrate.

2. The device according to claim 1 further comprising at least one bird capture pocket in the bird netting.

3. The device according to claim 1 wherein the attachment devices are carabiners.

* * * * *